(12) United States Patent
Kelso et al.

(10) Patent No.: US 8,001,245 B2
(45) Date of Patent: Aug. 16, 2011

(54) SYSTEM AND METHOD FOR AUTONOMICALLY CONFIGURABLE ROUTER

(75) Inventors: Scott Edwards Kelso, Durham, NC (US); John C. Mese, Cary, NC (US); Nathan J. Peterson, Raleigh, NC (US); Rod David Waltermann, Durham, NC (US); Arnold S. Weksler, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1328 days.

(21) Appl. No.: 11/142,623

(22) Filed: Jun. 1, 2005

(65) Prior Publication Data

US 2006/0277603 A1  Dec. 7, 2006

(51) Int. Cl.
*G06F 15/16* (2006.01)
(52) U.S. Cl. ........ 709/226; 709/227; 709/220; 709/223; 709/224
(58) Field of Classification Search .................. 709/220, 709/226–227
See application file for complete search history.

(56) References Cited

U.S. PATENT DOCUMENTS

| 5,859,852 | A * | 1/1999 | Moura et al. ................. 370/449 |
| 7,145,871 | B2 * | 12/2006 | Levy et al. .................... 370/229 |
| 7,506,054 | B1 * | 3/2009 | Fuh et al. ...................... 709/225 |
| 2003/0115344 | A1 * | 6/2003 | Tang et al. .................... 709/229 |
| 2003/0117965 | A1 | 6/2003 | Markki et al. ................ 370/254 |
| 2003/0133434 | A1 | 7/2003 | Johansson et al. ............ 370/349 |
| 2003/0236870 | A1 | 12/2003 | Boibie et al. ................. 709/223 |
| 2004/0111590 | A1 | 6/2004 | Klein, Jr. ..................... 712/226 |
| 2004/0160907 | A1 | 8/2004 | Perlman ....................... 370/319 |
| 2005/0053050 | A1 * | 3/2005 | Ballinger et al. ............. 370/351 |
| 2010/0105481 | A2 * | 4/2010 | Hogan et al. .................. 463/42 |

FOREIGN PATENT DOCUMENTS

WO    WO 03/048933 A1    6/2003
WO    WO 2004/014047 A2    2/2004

OTHER PUBLICATIONS

"The Lightning Flash," *Network World*, Mar. 1998 (2 pages).

* cited by examiner

*Primary Examiner* — Kenny S Lin
*Assistant Examiner* — Sulaiman Nooristany
(74) *Attorney, Agent, or Firm* — Van Leeuwen & Van Leeuwen; Thomas E. Tyson

(57) ABSTRACT

A system and method for autonomically configuring a router are presented. An agent is installed on a client that tracks resource authorizations for particular applications. The agent sends a configuration request to a router that requests the router to change one or more router parameters, such as assigning a port to the client. The router compares the configuration request against its router policies, and changes router parameters (assigns resources) based upon the configuration request. Once the agent and the router authorize the resources, the application uses the resources to communicate with a computer network through the client resource and the router resource. When the application is terminated, the router and the client disable their respective resources.

15 Claims, 7 Drawing Sheets

| AUTHORIZED RESOURCE TABLE |||
|---|---|---|
| Router MAC Address | Application | Port |
| 12-43-51-83-32-67 | WebBrowser.exe | 80 |
| | Game1.exe | 2235 |
| | | 94 |
| | ftp.exe | 21 |
| | telnet.exe | 23 |
| 14-45-51-45-33-39 | WebBrowser.exe | 80 |

*Figure 6A*

| ROUTER POLICY STORE ||
|---|---|
| MAC Address | Policy |
| 44-45-51-34-32-76 | Port 80 anytime |
| | Port 2235 between 8AM-10PM |
| 62-45-51-53-32-37 | Port 80 anytime |
| 63-48-51-30-30-90 | Port 80 anytime |
| | Port 21 anytime |
| | Port 23 anytime |

SYSTEM AND METHOD FOR AUTONOMICALLY CONFIGURABLE ROUTER

BACKGROUND OF THE INVENTION

1. Technical Field

The present invention relates in general to a system and method for autonomically configuring a router. More particularly, the present invention relates to a system and method to provide a client with the ability to configure a router without assistance from a user based upon an application's resource request.

2. Description of the Related Art

Computer networks have been evolving in the business environment and the household environment for some time. Today, business environments and household environments typically use a combination of technologies to establish wired and/or wireless computer networks.

One of the key components of a computer network is a router. A router links two networks together, such as a wireless network and the Internet or a company Intranet. The router may also act as a firewall by passing data between networks based on a configuration table. A configuration table includes router parameters such as port assignments, connection priorities, and rules for handling both routine and special cases of traffic. A configuration table may be as simple as a half-dozen lines in the smallest routers, but may grow to massive size and complexity for routers that handle the bulk of Internet messages.

A challenge found with existing routers, however, is that a user must access the router in order to change particular router parameters. For example, if a user has a gaming application installed on his computer that requires a dedicated port for streaming video, and the computer accesses the Internet through a router, the user must access the router configuration settings and manually dedicate a router port to the computer. In addition, another challenge found is that if the user forgets to re-access the router to close the port, the port stays open, which may be a security concern.

SUMMARY

What is needed, therefore, is a system and method for a client computer system to autonomically configure router parameters based upon the client computer system's application requirements. The client computer system includes an agent that manages resource authorizations that correspond to particular applications. The agent communicates with the router to change configurations in order to accommodate the application's resource requirements. Once the agent and the router authorize the resources, the application uses the resources to communicate with a computer network through the client resource and the router resource. When the application terminates, the router and the client unassign their respective resources to the application.

A user uses a client to execute an application. The client is connected to a router, which communicates with a computer network (e.g. the Internet). For example, the client may be a laptop computer with a gaming application installed, and the client interfaces with a wireless home router that is connected to the Internet. In this example, the gaming application requests a port assignment in order for the gaming application to exchange streaming data with a web host on the Internet.

When the user invokes the application, the application identifies resources and, for example, determines that it requires a port to send and receive data. The application sends a request to the port's driver but, since the port is not yet assigned to the application, the client's agent intercepts the request and checks an authorized resource table. If the application is authorized for the resource, the agent forwards the request to the router. On the other hand, if the application is not authorized for the resource, the agent sends an authorization request to the user. In turn, the user provides an authorization response to the agent that authorizes the application to use the requested resource.

Subsequently, the agent sends a configuration request to the router, requesting the router to configure one or more router parameters. For example, the configuration request may include a request for the router to assign a gaming port to the client. The router identifies the client, and accesses policies to determine whether the configuration request is valid. For example, a home router may be configured to assign a gaming port to a child's computer only between the hours of 8:00 pm and 10:00 pm.

The router sends a configuration response to the client, which informs the client that the router approved the configuration request. In turn, the client assigns one of its ports to the application and the application exchanges data with a computer network through the client's port and the router's port. When the application terminates, the client and the router close their respective ports.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 6A is a diagram showing an authorized resource table that an agent accesses when assigning ports to an application;

FIG. 6B is a diagram showing a lookup table that a router accesses when the router receives a configuration request from a client in order to determine whether to perform the requested configuration.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
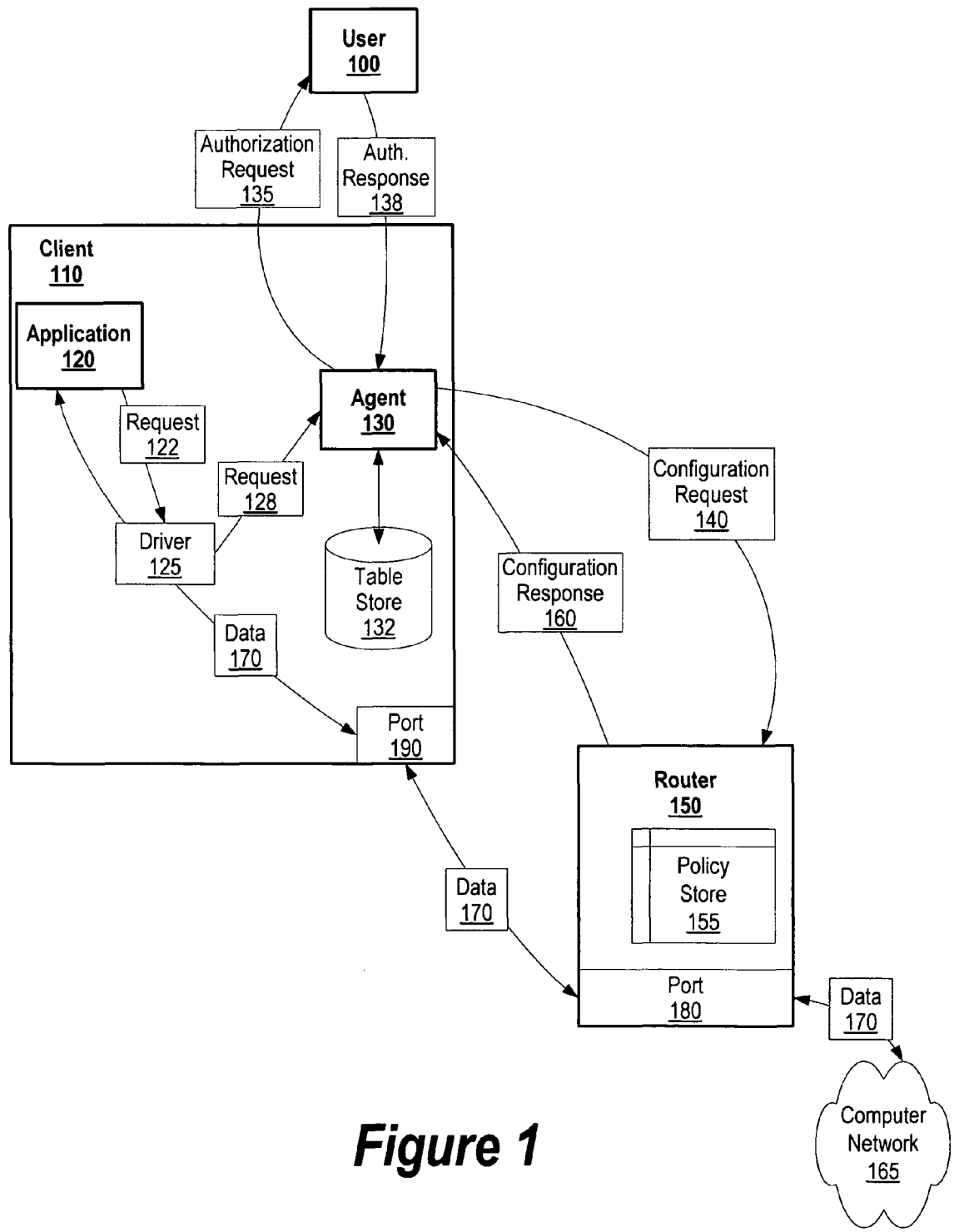
FIG. 1 is a diagram of a client configuring a router using an agent in response to an application request.

FIG. 1 is a diagram of a client configuring a router using an agent in response to an application request. User 100 uses client 110 to execute application 120. Client 110 is connected to router 150, which communicates with computer network 165 (e.g. the Internet). For example, client 110 may be a laptop computer with a gaming application installed, which interfaces with a wireless home router that is connected to the Internet. In this example, the gaming application requests a port assignment in order for the gaming application to exchange streaming data with a web host on the Internet.

When user 100 invokes application 120, application 120 identifies resources and, in the example shown in FIG. 1, determines that it requires a port to send and receive data. Application 120 sends request 122 to driver 125 that corresponds to the required port. Since application 120 has not yet been assigned to the required port, driver 125 sends resource request 128 agent 130, which is a resource management tool. Agent 130 accesses table store 132 to determine whether user 100 has previously authorized application 120 for the requested resource. Table store 132 includes a list of previously authorized resource entries in order for agent 130 to forgo requesting authorization from user 100 each time that it receives subsequent requests from application 120. In one embodiment, for security reasons, agent 130 may be configured to request resource authorization from user 100 for each request it receives from application 120, regardless of previous authorizations. Table store 132 may be stored on a nonvolatile storage area, such as a computer hard drive.

When agent 130 determines that it does not have a corresponding authorized resource entry in table store 132, agent 130 sends authorization request 135 to user 100. In turn, user 100 provides authorization response 138 to agent 130 that authorizes application 120 to use the requested resource.

As a result, agent 130 sends configuration request 140 to router 150 requesting the router to configure one or more router parameters. For example, configuration request 140 may include a request for router 150 to assign a gaming port to client 110. Router 150 identifies client 110, and uses policy store 155 to determine whether configuration request 140 is valid. For example, a home router may be configured to assign a gaming port to a child's computer only between the hours of 8:00 pm and 10:00 pm. Policy store 155 may be stored on a volatile storage area, such as internal memory.

Router 150 sends configuration response 160 to client 110 informing client 110 that router 150 approved configuration request 140. The example shown in FIG. 1 shows that router 150 assigns port 180 to client 110. In addition, client 110 assigns port 190 to application 120. As such, application 120 exchanges data 170 with computer network 165 through client 110's port 190 and router 150's port 180. When application 120 terminates, client 110 closes port 190 and router 150 closes port 180.

Figure 2:
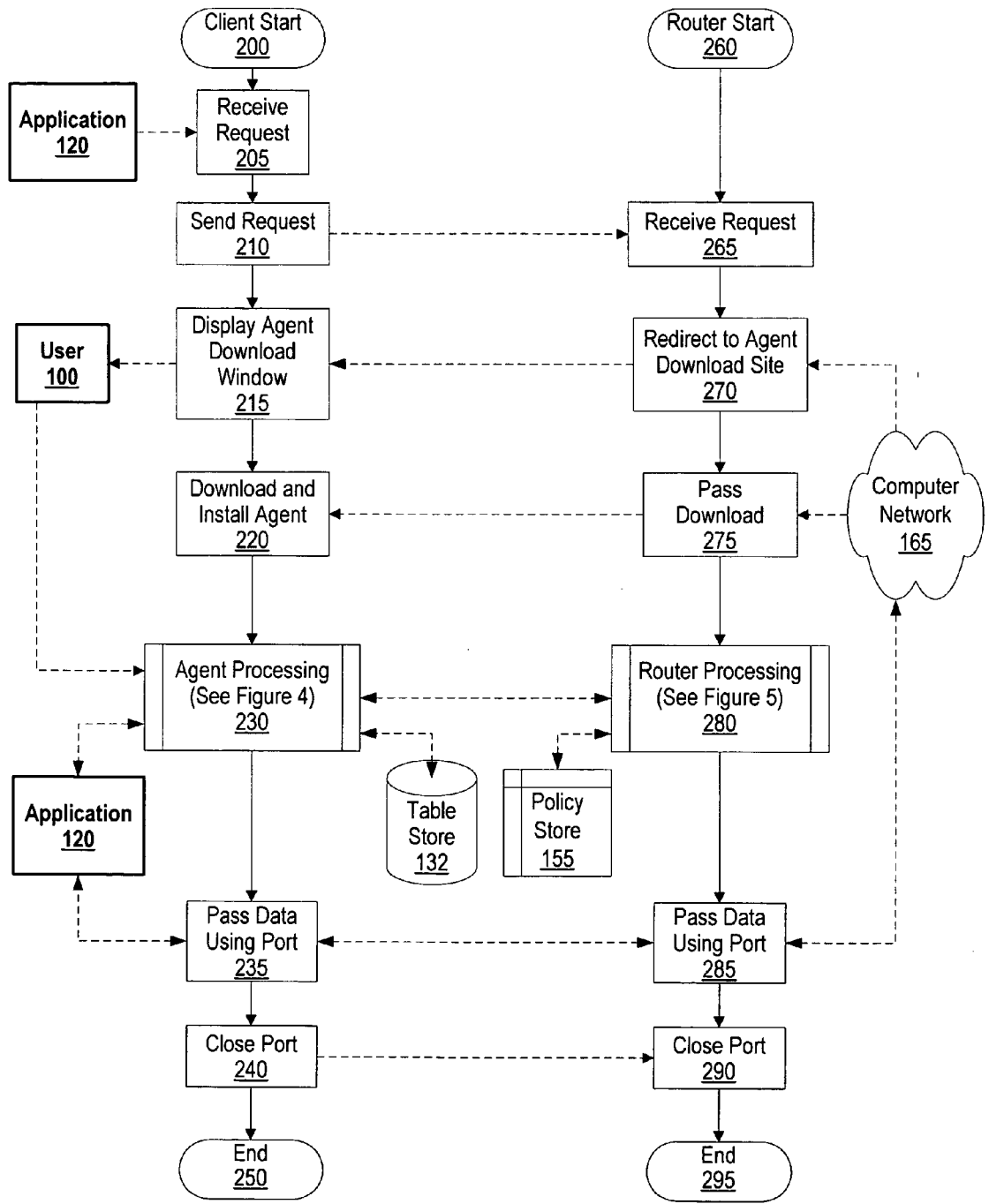
FIG. 2 is a flowchart showing steps taken in a client downloading an agent and using the agent to configure one or more router parameters for use in communicating with a computer network.

FIG. 2 is a flowchart showing steps taken in a client downloading an agent and using the agent to configure one or more router parameters for use in communicating with a computer network. Once the agent is installed, the client uses the agent to send configuration requests (e.g., a port assignment request) to a router, which configures one or more router parameters based upon one or more router policies.

Client processing commences at 200, whereupon the client receives a resource request from application 120 (step 205) that, in turn, the client sends to the router (step 210). For example, application 120 may be a gaming application and requests the client to open a particular port for gaming, such as port "2235."

Router processing commences at 260, whereupon the router receives the client's request at step 265 and determines that the client does not have an agent installed. For example, the router may send an identify packet to the client system and, if the agent is present, the client returns a version number and agent identifier. In another example, the client's request may include agent information in the TCP/IP header.

As a result, the router redirects the client to an agent download location, such as the router manufacturer's website on computer network 165 (step 270). Computer network 165 is the same as that shown in FIG. 1.

On the client side, the client is redirected and displays an agent download window to user 100 at step 215. User 100 instructs the client to download and install the agent from computer network 165 through the router, which is performed at steps 220 and 275.

Once the agent is downloaded and installed, the agent uses table store 132 and user 100's input to authorize application 120's request, and send a configuration request to the router. The router uses policy store 155 to authorize the agent's configuration request, and configures itself based upon the configuration request (pre-defined process blocks 230 and 280, see FIGS. 4 and 5 for further details regarding agent processing and router configuration details, respectively).

The example in FIG. 2 shows that application 120 requests a port assignment. Therefore, once the agent and the router assign the ports, the router passes data from computer network 165 to the client through the assigned port (step 285), and the client passes the data to application 120 through its assigned port (step 235). This continues until application 120 terminates, at which point the client closes its port (step 240) and client sends a disable request to the router to close its port (step 290). Client processing ends at 250 and router processing ends at 295.

Figure 3:
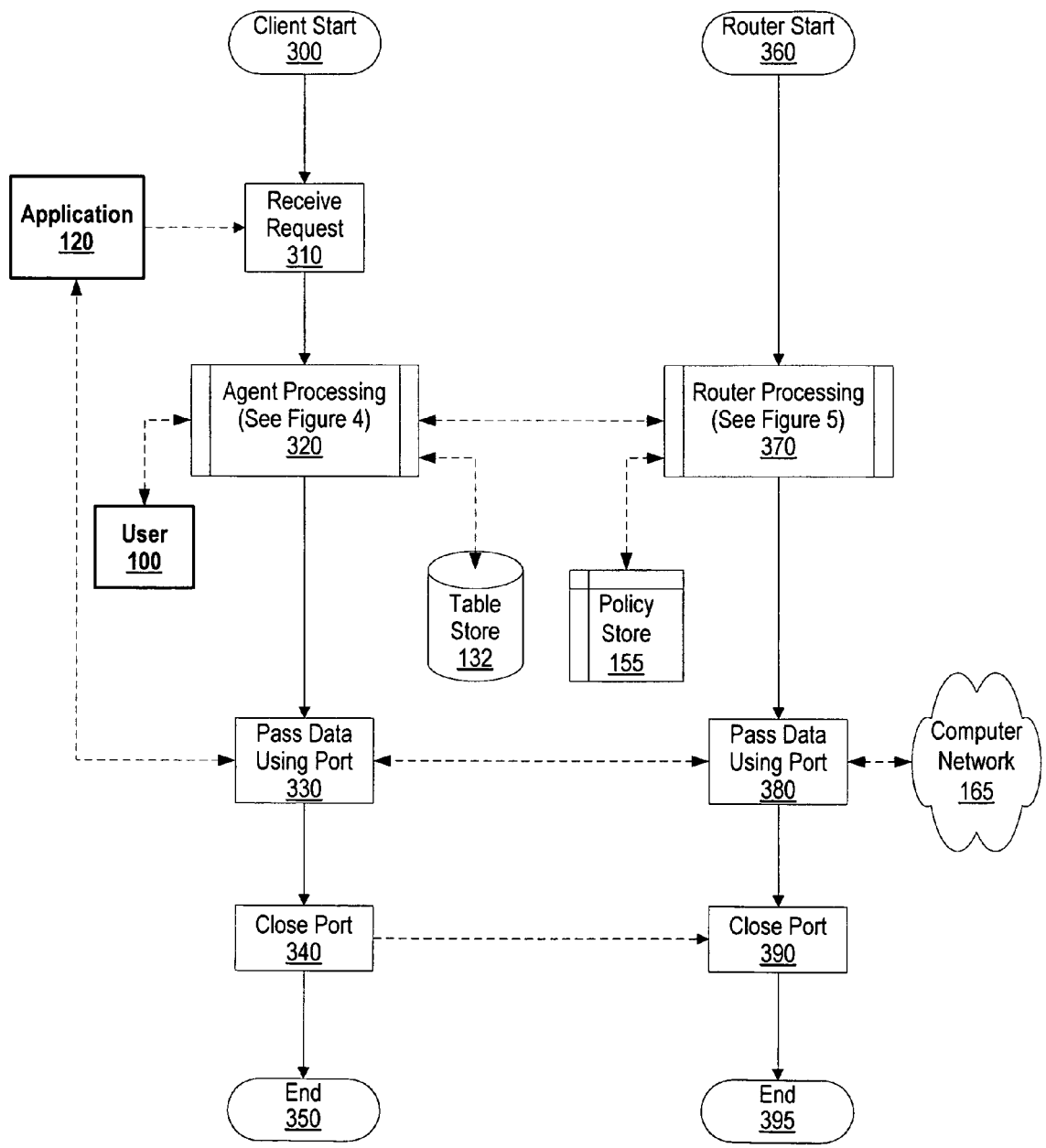
FIG. 3 is flowchart showing steps taken in a client using an agent that is installed on the client to configure one or more router parameters for use in communicating with a computer network.

FIG. 3 is flowchart showing steps taken in a client using an agent that is installed on the client to configure one or more router parameters for use in communicating with a computer network. FIG. 3 is similar to FIG. 2 with the exception that the agent is already installed on the client when the client receives application 120's request.

Client processing commences at 300, whereupon the client receives a resource request from application 120 (step 310). The client's agent traps the resource request and uses table store 132 and user 100's input to authorize application 120's request, and send a configuration request to the router. Router processing commences at 360, whereupon the router uses policy store 155 to authorize the agent's configuration request, and configures itself based upon the configuration request (pre-defined process blocks 320 and 370, see FIGS. 4 and 5 for further details regarding agent processing and router configuration details, respectively).

The example in FIG. 3 shows that application 120 requests a port assignment. Therefore, once the agent and the router assign the ports, the router passes data from computer network 165 to the client through the assigned port (step 380), and the client passes the data to application 120 through its assigned port (step 330). This continues until application 120 terminates, at which point the client closes its port (step 340) and client sends a disable request to the router to close its port (step 390). Client processing ends at 350 and router processing ends at 395.

Figure 4:
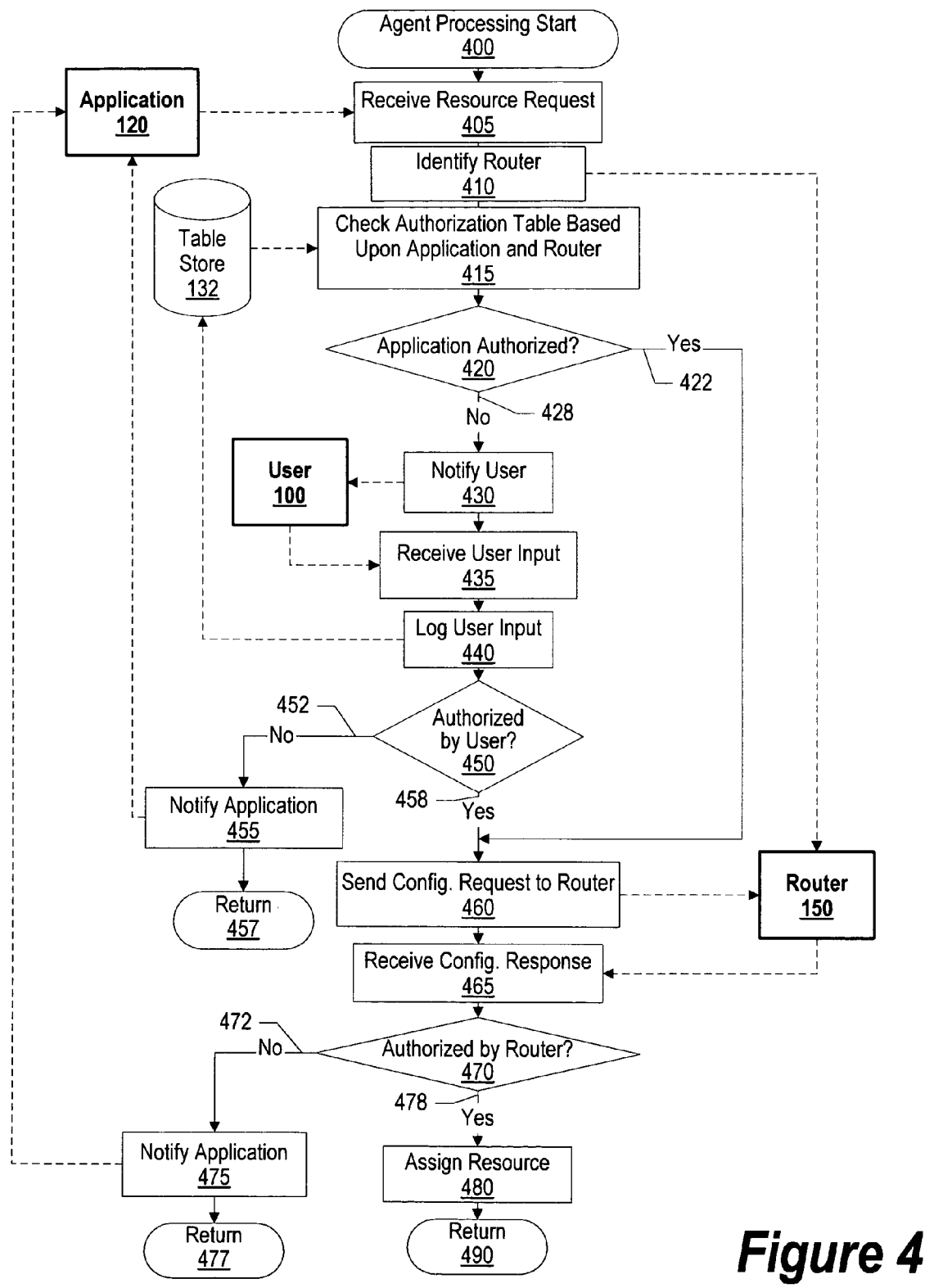
FIG. 4 is a flowchart showing steps taken in an agent processing a resource request from an application.

FIG. 4 is a flowchart showing steps taken in an agent processing a resource request from an application. Agent processing commences at 400, whereupon the agent receives a resource request from application 120 at step 405. For example, application 120 may be a gaming application that requests a particular port assignment, such as port "2235." Application 120 is the same as that shown in FIG. 1.

The agent identifies the router that is connected to its client (step 410) in order to determine which authorized resource entries to check in table store 132. Each authorized resource entry has been previously authorized by user 100, and is organized by router identification (MAC address) and application. For example, a laptop computer may be connected to a home router, and the user authorized a gaming application to use port 2235. In this example, the user may take the laptop computer to work, which connects to a work router, in which case the user has not authorized the gaming application to use port 2235 in conjunction with the work router (see FIG. 6A and corresponding text for further details regarding authorized resource entries). Table store 132 and user 100 are the same as that shown in FIG. 1.

At step 415, the agent checks the authorized resource entries in table store 132 based upon the identified router and application 120. A determination is made as to whether application 120 has an existing authorized resource entry that corresponds to the resource request (decision 420). If application 120 has an existing authorized resource entry corresponding to the resource request, decision 420 branches to "Yes" branch 422 bypassing resource authorization steps.

On the other hand, if application 120 does not have an existing authorized resource entry that corresponds to the resource request, decision 420 branches to "No" branch 428 whereupon the agent notifies user 100 of application 120's resource request (step 430). At step 435, the agent receives user 100's input and, at step 440, the agent stores the user's input as an authorized resource entry in table store 132. For example, user 100 may authorize application 120 to access port "5548," in which case the agent stores an authorized resource entry in table store 132, referencing the identified router and application 120, that application 120 is authorized to access port 5548.

A determination is made as to whether user 100 authorized application 120's resource request (decision 450). If user 100 did not authorize the resource request, decision 450 branches to "No" branch 452 whereupon the agent notifies application 120 (step 455) and returns at 457.

On the other hand, if user 100 did authorize application 120's resource request, decision 450 branches to "Yes" branch 458 whereupon the agent sends a configuration request to router 150 at step 460. Router 150 checks its policies against the configuration request, and sends a response back to the agent, which it receives at step 465. In one embodiment, router 150 may detect that a requested resource is being used by another client, and may send an override notice to the client. In this embodiment, the client may inform user 100 and, user 100 may instruct the client's agent to instruct router 150 to override its existing resource configuration and approve the current configuration request (see FIG. 5 and corresponding text for further details regarding router authorization steps). Router 150 is the same as that shown in FIG. 1.

A determination is made as to whether router 150 approved the configuration request based upon the router's policies (decision 470). For example, router 150 may be a home router that has been configured to allow a child's computer to use a gaming port between the hours of 8:00 pm and 10:00 pm. If router 150 did not approve the configuration request, decision 470 branches to "No", branch 472 whereupon the agent notifies application 120 at step 475, and agent processing returns at 477.

On the other hand, if router 150 did approve the configuration request, decision 470 branches to "Yes" branch 478 whereupon the agent assigns the requested resource to application 120, such as a port, at step 480, and agent processing returns at 490.

Figure 5:
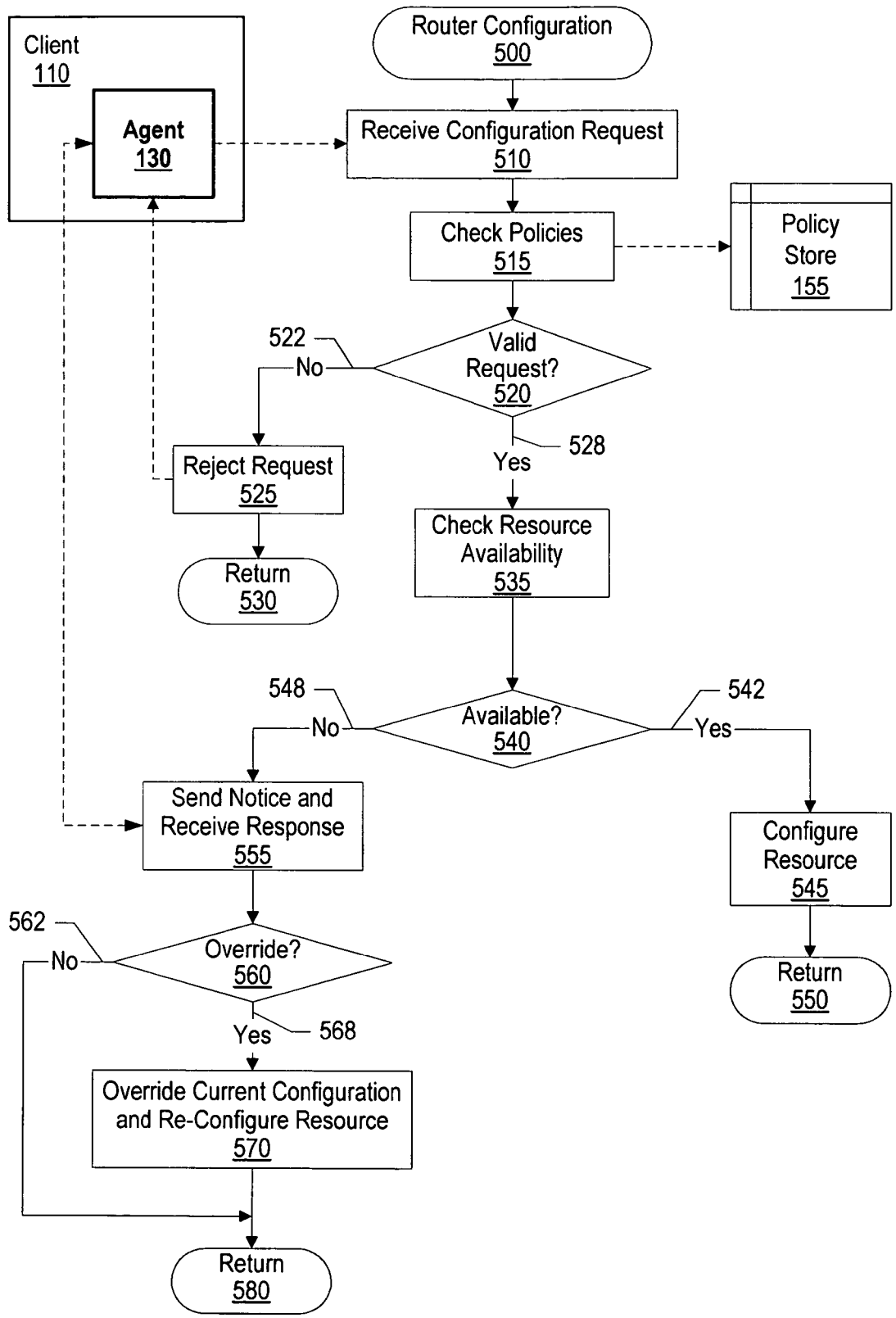
FIG. 5 is a flowchart showing steps taken in a router configuring one or more router parameters in response to receiving a configuration request.

FIG. 5 is a flowchart showing steps taken in a router configuring one or more router parameters in response to receiving a configuration request. Router processing commences at 500, whereupon the router receives a configuration request from agent 130, which is located on client 110 (step 510). Client 110 and agent 130 are the same as that shown in FIG. 1.

The router retrieves policies from policy store 155 at step 515, whereby the policies instruct the router as to what resources client 110 is authorized. For example, client 110 may by a children's computer system and the router includes a router policy that allows a router's port (e.g. gaming port) to be assigned to the children's computer system between 8:00 pm and 10:00 pm (see FIG. 6B and corresponding text for further details regarding router policies). Policy store 155 is the same as that shown in FIG. 1.

A determination is made as to whether client 110 is authorized for the requested configuration (decision 520). For example, client 110 may be a parent's computer system that is authorized to be assigned any router resource at any time of day. If client 110 is not authorized for the requested configuration, decision 520 branches to "No" branch 522 whereupon the router rejects agent 130's request at step 525, and router processing returns at 530.

On the other hand, if client 110 is authorized for the requested configuration, decision 520 branches to "Yes" branch 528 whereupon the router checks the availability of a resource that corresponds to the configuration request (step 535). For example, agent 130 may be requesting a router port and the router port has already been assigned to another client on the network. A determination is made as to whether the corresponding resource is available (decision 540). If the resource is available to assign to client 110, decision 540 branches to "Yes" branch 542 whereupon the resource (e.g., port) is assigned to client 110 at step 545. Processing returns at 550.

On the other hand, if the resource is not available to assign to client 110, decision 540 branches to "No" branch 548 whereupon the router sends a resource conflict notice to client 110 at step 555. Client 110 informs its user, and the user sends a response. A determination is made as to whether the user wishes to override the current router configuration (decision 560). If the user wishes to override the current router configuration, decision 560 branches to "Yes" branch 568 whereupon the router overrides the current router configuration and configures the router based upon agent 130's configuration request (step 570). On the other hand, if the user does not wish to override the current router configuration, decision 560 branches to "No", branch 562 bypassing configuration overriding steps. Processing returns at 580.

FIG. 6A is a diagram showing an authorized resource table that an agent accesses when assigning ports to an application. Table 500 includes resources that have been authorized by a user based upon particular applications and routers that communicate with the client. For example, the user may have a laptop computer that communicates with a home router and a work router, and the user has authorized particular resources based upon which router the laptop is connected.

Table 500 includes columns 510, 515, and 520. Column 510 includes a Media Access Control (MAC) address for each router that has communicated with the client. Column 515 includes the names of applications that have requested particular resources and, column 520 includes corresponding resources (e.g., ports) that have been requested by the applications, which have been authorized by the user.

Table 500 includes MAC addresses 522 and 524. MAC address 522 may correspond to a home router, and has four authorized resource entries which are "WebBrowser.exe port 80," "Game1.exe port 2235," "Game1.exe port 94," "ftp.exe port 21," and "telnet.exe port 23." MAC address 524 may correspond to a work router, and has one authorized resource entry, which is "WebBrowser.exe port 80."

FIG. 6B is a diagram showing a lookup table that a router accesses when the router receives a configuration request from a client in order to determine whether to perform the requested configuration. For example, a home router may be configured to allow a parent's computer to use any router port at any time of day, and be configured to allow a child's computer to use particular ports during particular times during the day (see FIG. 5 and corresponding text for further details regarding router authorization steps).

Table 630 includes client MAC addresses, which are addresses 635, 640, and 645. Address 635 includes two assigned policies, which are policy 650 and 655. As can be seen, address 635 is authorized to use router port 80 at any time (policy 650), and authorized to use port 2235 (a gaming port) between 8:00 pm and 10 pm (policy 655). Address 640 includes one assigned policy, which is policy 660. As can be seen, address 640 is authorized to use router port 80 at any time. Finally, address 645 includes three policies, which are policies 665 through 675. As can be seen, address 645 is authorized to use ports 80, 21, and 23 at any time (policies 665, 670, and 675, respectively).

Figure 7:
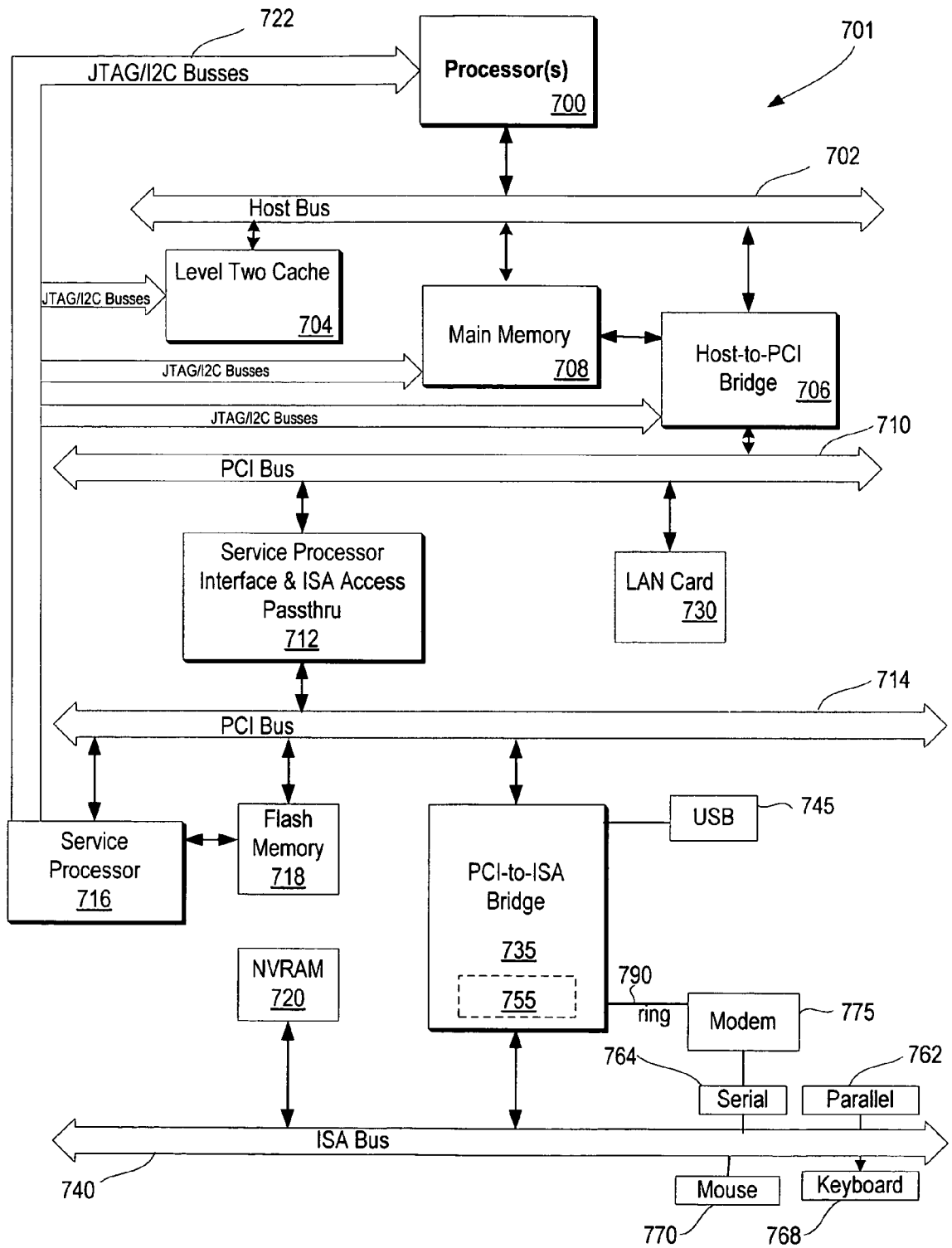
FIG. 7 is a block diagram of a computing device capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer operable storage medium, for example, in a hard disk drive, or in a removable memory such as an optical disk (for eventual use in a CD ROM) or floppy disk (for eventual use in a floppy disk drive). The set of instructions may also be downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving, at a client, a resource request from an application that is executing on the client;
   identifying a router that is accessible by the client;

determining whether an authorization table includes an authorized resource entry corresponding to both the application and the router, the authorized resource entry indicating that the application is authorized to utilize a resource of the router;
in response to determining that the authorization table fails to include the authorization resource entry corresponding to both the application and the router, sending an authorization request to a user that identifies the application and the router;
receiving an authorization response from the user that authorizes the application to access the router;
in response to receiving the authorization response, sending, at the client, a configuration request to the router;
receiving, from the router, a configuration response;
in response to the configuration response indicating that the router configured one or more router parameters, which is in response to the configuration request meeting one or more router policies that correspond to a time of day availability of the resource:
sending data from the application to a computer network through the router; and
in response to the configuration response indicating that the resource is unavailable:
sending an override request to the router that instructs the router to assign the resource to the client; and
sending the data from the application to the computer network through the router.

2. The method of claim 1 further comprising:
storing the authorization response on the client as the authorized resource entry.

3. The method of claim 2 further comprising:
retrieving the authorized resource entry;
comparing the authorized resource entry with the resource request; and
configuring one or more client resources based upon the comparing.

4. The method of claim 1 wherein one of the router parameters corresponds to assigning a router port to the client.

5. The method of claim 1 further comprising:
detecting that the application has terminated; and
sending a disable request to the router, wherein the router is adapted to disable one or more resources that correspond to the one or more router parameters in response to receiving the disable request.

6. A computer program product stored in a non-transitory computer operable storage medium, comprising functional descriptive material that, when executed by an information handling system, causes the information handling system to perform actions to:
receive, at a client, a resource request from an application that is executing on the client;
identify a router that is accessible by the client;
determine whether an authorization table includes an authorized resource entry corresponding to both the application and the router, the authorized resource entry indicating that the application is authorized to utilize a resource of the router;
in response to determining that the authorization table fails to include the authorization resource entry corresponding to both the application and the router, send an authorization request to a user that identifies the application and the router;
receive an authorization response from the user that authorizes the application to access the router;
in response to receiving the authorization response, send, at the client, a configuration request to the router;
receive, from the router, a configuration response;
in response to the configuration response indicating that the router configured one or more router parameters, which is in response to the configuration request meeting one or more router policies that correspond to a time of day availability of the resource:
send data from the application to a computer network through the router; and
in response to the configuration response indicating that the resource is unavailable:
send an override request to the router that instructs the router to assign the resource to the client; and
send the data from the application to the computer network through the router.

7. The computer program product of claim 6 wherein the information handling system further performs actions to:
store the authorization response on the client as the authorized resource entry.

8. The computer program product of claim 7 wherein the information handling system further performs actions to:
retrieve the authorized resource entry;
compare the authorized resource entry with the resource request; and
configure one or more client resources based upon the comparing.

9. The computer program product of claim 6 wherein one of the router parameters corresponds to assigning a router port to the client.

10. The computer program product of claim 6 wherein the information handling system further performs actions to:
detect that the application has terminated; and
send a disable request to the router, wherein the router is adapted to disable one or more resources that correspond to the one or more router parameters in response to receiving the disable request.

11. An information handling system comprising:
one or more processors;
a memory accessible by the processors;
one or more nonvolatile storage devices accessible by the processors; and
a resource management tool for configuring resources, the resource management tool being effective to:
receive, at a client, the resource request from an application that is executing on the client;
identify a router that is accessible by the client;
determine whether an authorization table includes an authorized resource entry corresponding to both the application and the router, the authorized resource entry indicating that the application is authorized to utilize a resource of the router;
in response to determining that the authorization table fails to include the authorization resource entry corresponding to both the application and the router, send an authorization request to a user that identifies the application and the router;
receive an authorization response from the user that authorizes the application to access the router;
in response to receiving the authorization response, send, at the client, a configuration request to the router;
receive, from the router, a configuration response;
in response to the configuration response indicating that the router configured one or more router parameters, which is in response to the configuration request meeting one or more router policies that correspond to a time of day availability of the resource:

send data from the application to a computer network through the router; and
in response to the configuration response indicating that the resource is unavailable:
send an override request to the router that instructs the router to assign the resource to the client; and
send the data from the application to the computer network through the router.

12. The information handling system of claim 11 wherein the resource management tool is further effective to:
store the authorization response on one of the nonvolatile storage devices as the authorized resource entry.

13. The information handling system of claim 12 wherein the resource management tool is further effective to:
retrieve the authorized resource entry from one of the nonvolatile storage devices;
compare the authorized resource entry with the resource request; and
configure one or more client resources based upon the comparing.

14. The information handling system of claim 11 wherein one of the router parameters corresponds to assigning a router port to the client.

15. The information handling system of claim 11 wherein the resource management tool is further effective to:
detect that the application has terminated; and
send a disable request to the router, wherein the router is adapted to disable one or more resources that correspond to the one or more router parameters in response to receiving the disable request.

* * * * *